Figure 1:
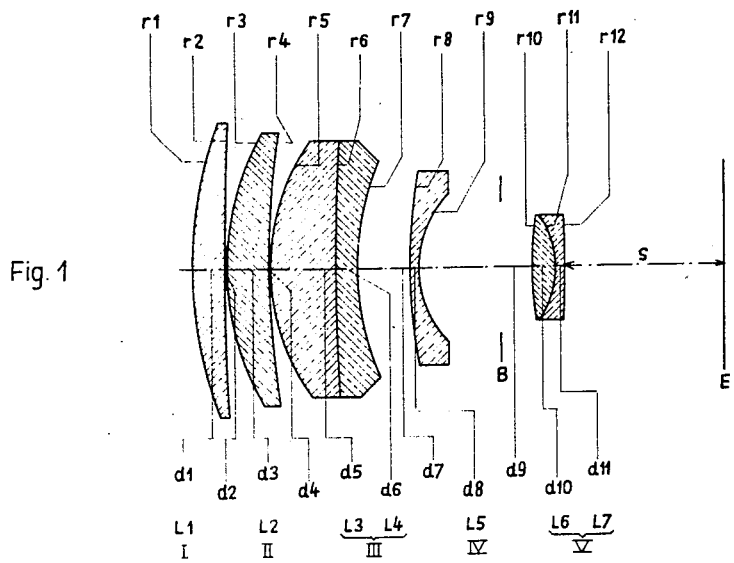

Feb. 22, 1966    R. SOLISCH ETAL    3,236,151
PHOTOGRAPHIC OR CINEMATOGRAPHIC HIGH-SPEED TELEOBJECTIVE
Filed July 16, 1962

INVENTORS:
Rudolf SOLISCH
BY  Walter WÖLTCHE

Karl J. R...
AGENT

3,236,151
PHOTOGRAPHIC OR CINEMATOGRAPHIC
HIGH-SPEED TELEOBJECTIVE
Rudolf Solisch, Gottingen, and Walter Wöltche, Bad
Kreuznach, Germany, assignors to Josef Schneider &
Co., Optische Werke, Bad Kreuznach, Germany, a
company of Germany
Filed July 16, 1962, Ser. No. 209,845
Claims priority, application Germany, Aug. 2, 1961,
Sch 30,074
3 Claims. (Cl. 88—57)

Our present invention relates to photographic or cinematographic objectives of large focal length, i.e. to so-called teleobjectives, in which a two-component lens group on the object side of a diaphragm space, i.e. on the side of the longer light rays, co-operates with a single lens component on the image side, or side of the shorter light rays.

In U.S. Patent No. 2,910,914, issued November 3, 1959 to R. Solisch, there has been disclosed an objective of this general type with a single positively refracting lens member at the image side of the system and a two-member front component separated from this rear member by a relatively large diaphragm space, the front component consisting of a collective singlet on the object side and a dispersive triplet following this singlet with small axial spacing. This system has a relative aperture of 1:2.8 and an overall axial dimension (total physical length of lens assembly, from the first to the last vertex, plus back-focal length) approximately equal to its overall focal length.

The general object of our present invention is to provide an improved system of this character which has a greater relative aperture, preferably of about 1:2, while maintaining the aforementioned relationship between axial dimension and focal length. The objective, which is to be particularly adapted for use with commercially available miniature-type cameras of limited entrance aperture, should have an overall focal length equal to at least three times the image diagonal; with an image size of 24 x 36 mm., for example, this focal length may be equal to 180 mm.

The above object is realized, in accordance with our invention, by the provision of an objective of the general construction referred to wherein, however, the multilens front component consists of a single negative member facing the positive rear component and, separated from it by a substantial air space, of three positive members positioned forwardly thereof, at least one of these positive members being preferably composed of two lenses of opposite refractivity cemented together.

Advantageously, in order to satisfy the aforestated desideratum regarding the overall axial dimension of the system, the air space separating the first three positive lens members from the negative lens member of the front group bears a definite relationship with the diaphragm space which separates this front group from the single rear member, the ratio of the first-mentioned air space to the diaphragm space ranging preferably between approximately 1:2.3 and 1:1 while the sum of these two spaces amounts to at least 28% of the equivalent overall focal length of the system.

We have found that good correction of chromatic aberrations can be achieved if the third lens member, as seen from the object side of the system, is cemented from a positive and a negative lens whose Abbé numbers ($\nu$) differ by at least 20, preferably by 25–30, the refractive power of the cemented surface between these lenses ranging at the same time between $-0.03$ and $+0.04$ with the overall focal length of the system taken as unity. The refractive power $\varphi$, like the Abbé numbers $\nu$, is here considered with reference to the $e$ line of the spectrum and is thus given by the formula $$\varphi = \frac{n'_e - n_e}{r}$$

where $n'_e$ and $n_e$ are the refractive indices of the two lenses cemented together at a surface of radius $r$.

For a maximum correction of aberrations it is desirable to constitute the single rear member of the system likewise as a doublet composed of a collective and a dispersive lens, the radius of its cemented surface being preferably less than $0.3f$ ($f$ being the overall focal length) while the refractive indices $n_e$ of these lenses differ by approximately 0.02 to 0.07. In this case the entrance-pupil aberration in a direction perpendicular to the system does not exceed the magnitude of $0.00001f$ with a relative aperture of 1:2. With less rigorous requirements as to overall aberration correction, this rear member may also be a singlet, preferably one whose Abbé number is below 40 to suppress the color-magnification aberration.

In general it is possible in a system according to our invention to utilize for the first two lens members glasses of very low refractivity, whose $n_e$ is less than 1.55, with consequent saving of weight and cost and without any objectionable reduction in the optical qualities of the objective. Naturally, more highly refractive glasses could also be used for these members to provide additional optical effects.

Figure 2:
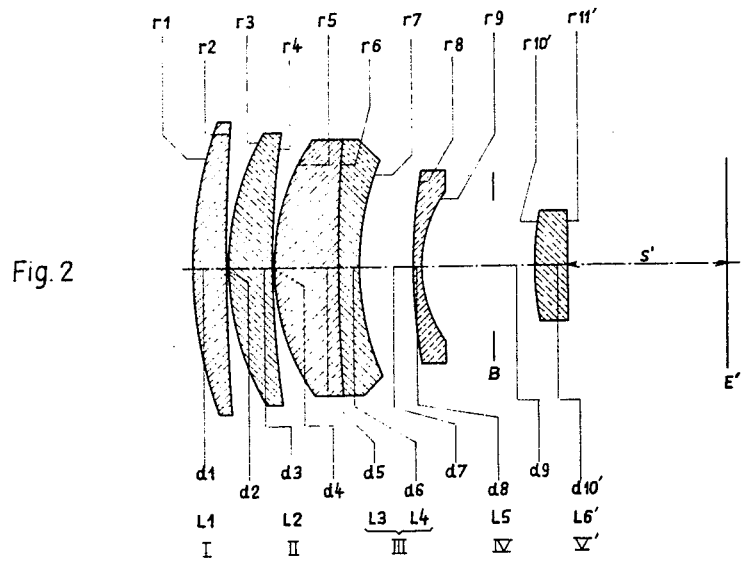

The invention will be described in greater detail with reference to the accompanying drawing in which FIGS. 1 and 2 illustrate two representative embodiments.

The teleobjective shown in FIG. 1 comprises a front group, consisting of two singlets I and II, a doublet III and a further singlet IV, and a single rear member V. Singlet I is a meniscus-shaped, almost plano-convex positive lens L1 having radii of curvature $r1$, $r2$ and thickness $d1$; it is separated by a small air space $d2$ from the likewise meniscus-shaped positive lens L2 (radii $r3$, $r4$ and thickness $d3$) constituting the singlet II. Another small air space $d4$ separates lens L2 from the positively refracting doublet III which is composed of a positive lens L3 (radii $r5$, $r6$ and thickness $d5$) and a negative lens L4 (radii $r6$, $r7$ and thickness $d6$). Doublet III is followed, after a relatively large air space $d7$, by a negative lens L5 (radii $r8$, $r9$ and thickness $d8$) representing the member IV. A still larger air space $d9$, containing the diaphragm B, separates the front group I–IV from the rear member V which consists of a positive lens L6 (radii $r10$, $r11$ and thickness $d10$) cemented onto a negative lens L7 (radii $r11$, $r12$ and thickness $d11$). The back-focal length between the last vertex of the system and the image plane E has been indicated at $s$.

The system shown in FIG. 1 is designed for a relative aperture of 1:2 and a back-focal length of $s=29.1$. Representative numerical values for the parameters $r1$ to $r12$ and $d1$ to $d11$, based upon an overall focal length $f=100$, together with the refractive indices $n_e$ and the Abbé numbers $\nu$ thereof, are given in the following Table I:

Table I

| | | | | | $n_e$ | $\gamma$ |
|---|---|---|---|---|---|---|
| I | L1 | r1 =+ 80.59 | d1 | = 6.08 | 1.51871 | 63.96 |
| | | r2 =+581.56 | d2 | = 0.06 | Air space | |
| II | L2 | r3 =+ 52.28 | d3 | = 8.11 | 1.51871 | 63.96 |
| | | r4 =+174.19 | d4 | = 0.11 | Air space | |
| III | {L3 | r5 =+ 42.11 | d5 | =12.28 | 1.62287 | 60.06 |
| | L4 | r6 =+441.68 | d6 | = 4.15 | 1.70444 | 29.84 |
| | | r7 =+ 50.75 | d7 | =10.40 | Air space | |
| IV | L5 | r8 =+ 99.39 | d8 | = 1.55 | 1.70444 | 29.84 |
| | | r9 =+ 20.06 | d9 | =22.22 | Air space (Diaphragm) | |
| V | {L6 | r10=+ 62.49 | d10 | = 4.56 | 1.67245 | 44.71 |
| | L7 | r11=− 17.55 | d11 | = 2.07 | 1.62554 | 57.87 |
| | | r12=−259.70 | | | | |
| | | | $d_{total}$=71.59 | | | |

In FIG. 2, the same front component I–IV has been shown as in FIG. 1, yet the rear member V' beyond the diaphragm space d9 consists here of a singlet L6' with radii r10', r11' and thickness d10'. The back-focal length from the last vertex to the image plane E' has been designated s'.

In the following Table II we have listed representative values for the parameters of a system as shown in FIG. 2, the back-focal length s' being 29.6 while its aperture ratio and its overall focal length have the values given in the preceding example.

Table II

| | | | | | $n_e$ | $\gamma$ |
|---|---|---|---|---|---|---|
| I | L1 | r1 =+ 84.32 | d1 | = 6.34 | 1.51871 | 63.96 |
| | | r2 =+ 535.46 | d2 | = 0.06 | Air space | |
| II | L2 | r3 =+ 52.64 | d3 | = 7.94 | 1.51871 | 63.96 |
| | | r4 =+ 175.38 | d4 | = 0.11 | Air space | |
| III | {L3 | r5 =+ 43.86 | d5 | =12.36 | 1.62287 | 60.06 |
| | L4 | r6 =+ 377.84 | d6 | = 4.18 | 1.70444 | 29.84 |
| | | r7 =+ 49.03 | d7 | =10.48 | Air space | |
| IV | L5 | r8 =+ 104.87 | d8 | = 1.56 | 1.70444 | 29.84 |
| | | r9 =+ 24.47 | d9 | =22.37 | Air space (Diaphragm) | |
| V' | L6' | r10'=+ 55.47 | d10' | = 6.69 | 1.70444 | 29.84 |
| | | r11'=−3,130.83 | | | | |
| | | | $d_{total}$=72.09 | | | |

Although in both embodiments only the third member III of the front component has been shown as a doublet, cemented lenses may of course also be used in other parts of the system if further correction is desired; in some instances it will moreover be possible, at the expense of reduced performance, to dispense with the cemented surface r6 whose refractive power $\varphi$, if computed on the basis of the foregoing formula, will be found to range within the limits given above.

We claim:

1. An optical teleobjective system comprising a four-member front lens group and a single collective rear lens member separated therefrom by a diaphragm space, said front lens group consisting of three closely spaced positive lens members and a negative fourth lens member following said positive lens members with a relatively large air space, the ratio of said relatively large air space to said diaphragm space being substantially 1:2, the sum of said relatively large air space and said diaphragm space amounting to at least 28% of the overall focal length of the system, the third of said positive lens members being a doublet composed of a positively and a negatively refracting lens cemented together along a surface whose refractive power for the e line of the spectrum ranges substantially between the limits of −0.03 and +0.04, the Abbé numbers of said positively and negatively refracting lenses differing by a value greater than 20, the sum of the distance from the front vertex of the first positive lens member to the rear vertex of said rear lens member plus the back-focal length of the system being substantially equal to the overall focal length of the system, the first two of said positive lens members having refractive indices of a value less than 1.55 for the e line of the spectrum, said collective rear lens member being a doublet composed of a collective and a dispersive lens cemented together along a surface whose radius is less than 0.3 times said overall focal length, the refractive indices of said collective and dispersive lenses for the e line of the spectrum differing by a value ranging between substantially 0.02 and 0.07.

2. An optical teleobjective system comprising a four-member front lens group and a single collective rear lens member separated therefrom by a diaphragm space, said front lens group consisting of three closely spaced positive lens members and a negative fourth lens member following said positive lens members with a relatively large air space, the third of said positive lens members being a doublet composed of a positively and a negatively refracting lens, said collective rear lens member being a doublet composed of a collective and a dispersive lens, the numerical values of the radii of curvature r1 to r12 of the first positive lens member L1, the second positive lens member L2, the positively and negatively refracting lenses L3, L4 of said doublet, said fourth lens member L5 and the collective and dispersive lenses L6, L7 of said rear lens member, as well as the thicknesses and air spaces d1 to d11 thereof, based upon a numerical value of 100 for the overall focal length of the system, the refractive indices $n_e$ of the lenses L1 to L7 and the Abbé numbers $\nu$ thereof being substantially as given in the following table:

| | | | | $n_e$ | $\nu$ |
|---|---|---|---|---|---|
| L1 | r1 =+ 80.59 | d1 | = 6.08 | 1.51871 | 63.96 |
| | r2 =+581.56 | d2 | = 0.06 | Air space | |
| L2 | r3 =+ 52.28 | d3 | = 8.11 | 1.51871 | 63.96 |
| | r4 =+174.19 | d4 | = 0.11 | Air space | |
| L3 | r5 =+ 42.11 | d5 | =12.28 | 1.62287 | 60.06 |
| L4 | r6 =+441.68 | d6 | = 4.15 | 1.70444 | 29.84 |
| | r7 =+ 50.75 | d7 | =10.40 | Air space | |
| L5 | r8 =+ 99.39 | d8 | = 1.55 | 1.70444 | 29.84 |
| | r9 =+ 20.06 | d9 | =22.22 | Air space (Diaphragm) | |
| L6 | r10=+ 62.49 | d10 | = 4.56 | 1.67245 | 44.71 |
| L7 | r11=− 17.55 | d11 | = 2.07 | 1.62554 | 57.87 |
| | r12=−259.70 | | | | |
| | | total=71.59 | | | |

3. An optical teleobjective system comprising a four-member front lens group and a single collective rear lens member separated therefrom by a diaphragm space, said front lens group consisting of three closely spaced positive lens members and a negative fourth lens member following said positive lens members with a relatively large air space, the third of said positive lens members being a doublet composed of a positively and a negatively refracting lens, said collective rear lens member being a singlet, the numerical values of the radii of curvature $r1$ to $r11'$ of the first positive lens member L1, the second positive lens member L2, the positively and negatively refracting lenses L3, L4 of said doublet, said fourth lens member L5 and said collective rear lens member L6', as well as the thicknesses and air spaces $d1$ to $d10'$ thereof, based upon a numerical value of 100 for the overall focal length of the system, the refractive indices $n_e$ of the lenses L1 to L6' and the Abbé numbers $\nu$ thereof being substantially as given in the following table:

| | | | | $n_e$ | $\nu$ |
|---|---|---|---|---|---|
| L1 | $r1 = +\ 84.32$ | $d1$ | $= 6.34$ | 1.51871 | 63.96 |
| | $r2 = +\ 535.46$ | $d2$ | $= 0.06$ | Air space | |
| L2 | $r3 = +\ 52.64$ | $d3$ | $= 7.94$ | 1.51871 | 63.96 |
| | $r4 = +\ 175.38$ | $d4$ | $= 0.11$ | Air space | |
| L3 | $r4 = +\ 43.86$ | $d5$ | $=12.36$ | 1.62287 | 60.06 |
| L4 | $r6 = +\ 377.84$ | $d6$ | $= 4.18$ | 1.70444 | 29.84 |
| | $r7 = +\ 49.03$ | $d7$ | $=10.48$ | Air space | |
| L5 | $r8 = +\ 104.87$ | $d8$ | $= 1.56$ | 1.70444 | 29.84 |
| | $r9 = +\ 24.47$ | $d9$ | $=22.37$ | Air space (Diaphragm) | |
| L6' | $r10' = +\ 55.47$ | $d10'$ | $= 6.69$ | 1.70444 | 29.84 |
| | $r11' = -3,130.83$ | | | | |
| | | total | $=72.09$ | | |

References Cited by the Examiner

UNITED STATES PATENTS

2,861,500  11/1958  Tronnier _____ 88—57 X
3,033,081  5/1962  Baur et al. _____ 88—57

FOREIGN PATENTS

408,787  4/1934  Great Britain.

JEWELL H. PEDERSEN, *Primary Examiner.*

J. K. CORBIN, R. J. STERN, *Assistant Examiners.*